Aug. 1, 1933.  A. SMALLWOOD  1,920,602
CLAMP FOR TUBES, BARS, AND THE LIKE
Filed Sept. 11, 1930

INVENTOR
Alfred Smallwood
BY
B. Singer
ATTORNEY

Patented Aug. 1, 1933

1,920,602

UNITED STATES PATENT OFFICE 1,920,602

CLAMP FOR TUBES, BARS, AND THE LIKE

Alfred Smallwood, Handsworth, Birmingham, England

Application September 11, 1930, Serial No. 481,289, and in Great Britain September 11, 1929

2 Claims. (Cl. 189—36)

This invention relates to clamps particularly adapted for use in the erection of various structures such as scaffolding, supporting frames and the like and has for its general object to provide a clamp embodying a novel construction to afford an effective grip of the same upon tubes, bars or the like with which the clamp is intended for use.

According to the present invention I employ a clamp incorporating an arm or section adapted to embrace the tube, bar or the like. Such arm or section is adapted to be tightened by an action in which it is subjected to a pivotal movement and in which the arrangement is such that in the tightening process a pressure is imparted in a lateral direction, that is to say, in a tangential or substantially tangential direction in the case of circular work, to the periphery or perimeter of the work so that a high degree of mechanical advantage accrues in the application of the gripping pressure. The arrangement is such as to provide that the tightening operation is adapted to impart an inward or radial pressure to the work with the same object in view.

In carrying out this invention as applied to a clamp incorporating a hinged semi-circular or substantially semi-circular section, the said semi-circular or substantially semi-circular section is on its free side formed with clutch surfaces extending transversely to the length of the tube which clutch surfaces are provided upon tongues or projections which in the clamping action are drawn towards the companion member of the clamp in manner such that they not only move into relationship with the periphery of the tube tangentially but are also by a lever action caused to press upon the periphery of the tube in a direction towards or substantially towards the centre of the latter.

In order that this invention may be clearly understood and readily carried into practice reference may be had to the appended drawing in which:—

Figure 1:
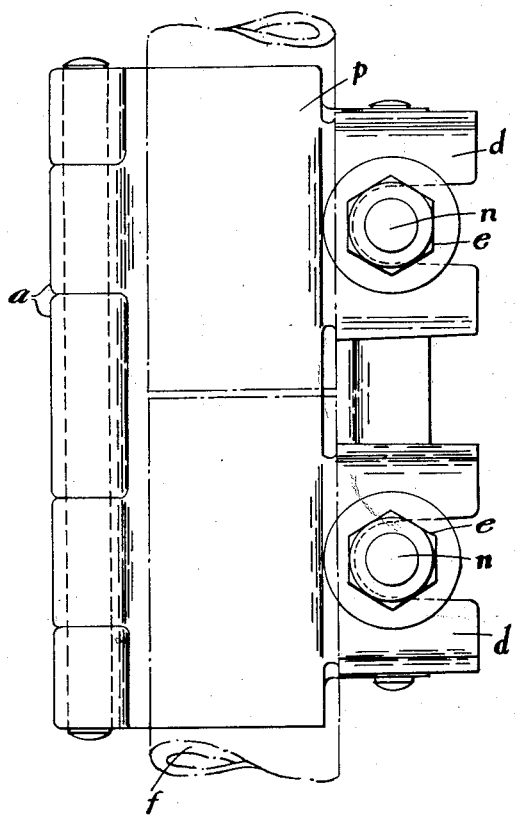
Figure 1 is a side elevation of a clamp embodying the features of the invention.
Figure 2:
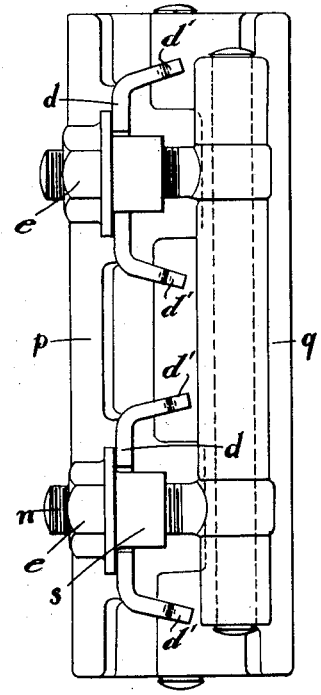
Figure 2 is an elevation at right angles to Figure 1.

Referring to the drawing in detail, it will be observed that the present clamp, according to the practical embodiment thereof illustrated, consists, essentially of two cooperating clamping members designated as $p$ and $q$, respectively. These clamping members, which may be formed from sheet metal or other suitable material, are of substantially semi-circular shape in cross section and are hinged together along adjacent edges as indicated at $a$ so that they may be relatively opened to receive a member such as a rod, bar, tube or the like, and subsequently closed upon said member. In the present instance the clamp is illustrated as having considerable length so that its respective end portions are adapted to receive the adjacent ends of a pair of members to be connected together. It is apparent, however, that the clamp may be of any suitable length and that it may be connected with another clamp, or used in any appropriate manner, either to connect a pair of tubes, rods or the like together or to connect one or more tubes, rods or the like to some other part of a structure.

In accordance with the invention, the free edge portion of one of the clamping members is suitably formed with an eye $b$ to receive a pin $c$ on which is pivoted a bolt $n$ for swinging movement to and from a position between a pair of spaced lugs $d$ which are formed to extend outwardly from the free edge portion of the other clamping member. On the bolt $n$ is threaded a nut $e$ to be screwed inward against the outer faces of the lugs $d$ when the bolt is swung to a position between said lugs, thus to draw the two clamping members into clamping engagement with a bar, tube or the like shown by dotted lines in Figures 1 and 3 of the drawing and designated as $f$.

Figure 3:
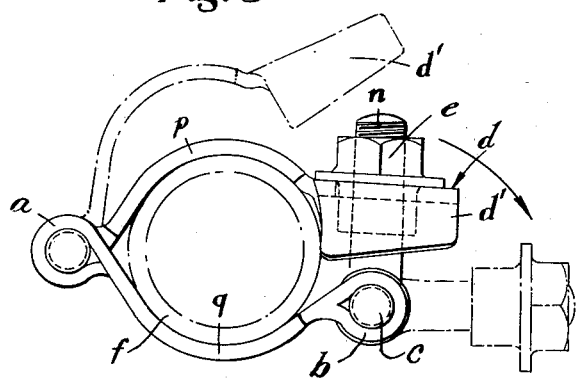
Figure 3 is an end elevation.

The curvature of the clamping members $p$, $q$ is predetermined to correspond, or to substantially correspond, to the curvature of the tube or other element $f$ with which the clamp is adapted for use, so that when the clamping members are swung to their closed position about said element, as shown in Figure 3, they are adapted to closely embrace the same. In this connection it will be observed that the lugs $d$ are provided along their outer edges with inwardly directed flanges $d1$ whereby said lugs are reinforced and stiffened. Moreover, it will be observed by particular reference to Figure 3 of the drawing that the inner corners of the flanges $d1$ at the junction of their free edges are disposed for engagement with the element $f$, and that the inner ends of said flanges, from said corners to the lugs $d$, are formed for clearance from the element $f$ when the clamping members $p$ and $q$ are disposed in embracing relation to said element, so that drawing of the clamping members together by the nut $e$, with consequent tendency to bend the lugs $d$ inwardly, results in the said inner corners of the flanges $d1$ biting into the element $f$ and consequent exceptionally effective gripping of the latter by the clamp.

Obviously the clamping elements *p* and *q* may be formed of any desired length and as many pairs of lugs *d* and cooperating bolts and nuts *n, e* as desired may be provided along their free edges.

I claim:

1. A clamp for use upon tubes, bars or the like comprising a pair of clamping members of substantially semicircular shape in cross section hinged together along adjacent edges, a pair of spaced lugs extending outwardly from the free edge of one of said members, a bolt pivoted to the free edge portion of the other member to be received between said lugs, a nut on said bolt for engagement with said lugs to draw the clamping members together into embracing relation to a tube, bar or the like, the outer edges of said lugs being provided with inwardly directed stiffening and reinforcing flanges, the inner corners at the junction of the free edges of said flanges being disposed for engagement with the tube, bar or the like when the members are drawn into embracing relation therewith, and the inner ends of said flanges from said corners to the lugs being formed for clearance from the tube, bar or the like when the inner corners of the flanges are engaged therewith, whereby said inner corners are adapted to bite into and effectively grip the bar, tube or the like under the influence of the clamping pressure exerted upon the clamping members by the nut.

2. A clamp for use upon tubes, bars or the like comprising a pair of clamping members of substantially semicircular shape in cross section hinged together along adjacent edges, lugs extending outwardly from the free edge portions of said members, a bolt pivoted to one of said lugs, a nut on said bolt for cooperation with the other lug to draw the members together into embracing relation to a tube, bar or the like, an inwardly directed stiffening flange carried by the last mentioned lug, the inner corner at the junction of the free edges of said flange being disposed for engagement with the tube, bar or the like when the members are drawn into clamping relation therewith, and the inner end of said flange from said corner to the lug being formed for clearance from the tube, bar or the like when said corner is engaged therewith, whereby said corner is adapted to bite into and effectively grip the tube, bar or the like under the influence of the clamping pressure exerted upon the members through said lug.

ALFRED SMALLWOOD.